United States Patent
Cheng

(10) Patent No.: US 8,286,738 B2
(45) Date of Patent: Oct. 16, 2012

(54) WHEEL SET STRUCTURE OF AN ELECTRIC WHEELCHAIR

(75) Inventor: Ming-Chuan Cheng, Taichung (TW)

(73) Assignee: Merits Health Products Co., Ltd., Taichung (TW)

(*) Notice: Subject to any disclaimer, the term of this patent is extended or adjusted under 35 U.S.C. 154(b) by 493 days.

(21) Appl. No.: 12/502,336

(22) Filed: Jul. 14, 2009

(65) Prior Publication Data

US 2011/0012316 A1   Jan. 20, 2011

(51) Int. Cl.
*B60K 1/00*   (2006.01)
(52) U.S. Cl. .............. 180/24.02; 280/755; 180/65.1; 180/22; 180/907
(58) Field of Classification Search ............... 180/65.1, 180/21, 22, 24.02, 65.51, 907; 280/755, 280/250.1
See application file for complete search history.

(56) References Cited

U.S. PATENT DOCUMENTS

| | | | | |
|---|---|---|---|---|
| 4,128,137 A * | 12/1978 | Booth | ............ | 180/6.5 |
| 6,554,086 B1 * | 4/2003 | Goertzen et al. | ............ | 180/65.1 |
| 7,066,290 B2 * | 6/2006 | Fought | ............ | 180/65.51 |
| 7,273,118 B2 * | 9/2007 | Huang | ............ | 180/65.1 |
| 7,293,801 B2 * | 11/2007 | Bertrand et al. | ............ | 280/755 |
| 7,306,247 B2 * | 12/2007 | Wu | ............ | 280/124.128 |
| 7,506,709 B2 * | 3/2009 | Kiwak et al. | ............ | 180/65.1 |
| 7,556,109 B2 * | 7/2009 | Chen et al. | ............ | 180/65.1 |
| 7,726,689 B2 * | 6/2010 | Mulhern et al. | ............ | 280/755 |
| 7,766,106 B2 * | 8/2010 | Puskar-Pasewicz et al. | | 180/65.1 |
| 2006/0022445 A1 * | 2/2006 | Mulhern et al. | ............ | 280/755 |
| 2006/0201723 A1 * | 9/2006 | Hsu et al. | ............ | 180/24.02 |
| 2006/0244249 A1 * | 11/2006 | Goertzen et al. | ............ | 280/755 |
| 2007/0209848 A1 * | 9/2007 | Tang | ............ | 180/65.1 |
| 2007/0290492 A1 * | 12/2007 | Kramer et al. | ............ | 280/755 |
| 2008/0264702 A1 * | 10/2008 | Cheng | ............ | 180/22 |
| 2010/0219623 A1 * | 9/2010 | Mulhern et al. | ............ | 280/755 |

* cited by examiner

*Primary Examiner* — Ruth Ilan
(74) *Attorney, Agent, or Firm* — Browdy and Neimark, PLLC

(57) ABSTRACT

A wheel set structure of an electric wheelchair is disclosed to include a wheelchair frame, which defines a first steering direction and a second steering direction reversed to the first steering direction, at least one swinging mechanism pivotally mounted on the wheelchair frame each having a swinging member and a wheel holder, at least one transmission wheel assembly connected to the swinging member each having a motor and a driving wheel coupled to and rotatable by the motor, and at least one first wheel assembly mounted on the wheel holder each pivotally holding a wheel. When the at least one swinging member is biased relative to the at least one wheelchair frame, the at least one first wheel assembly is biased with the at least one swinging member so that the elevation of the wheel of each first wheel assembly and the elevation of the driving wheel of each transmission wheel assembly are relatively changed at a constant ratio.

10 Claims, 8 Drawing Sheets

WHEEL SET STRUCTURE OF AN ELECTRIC WHEELCHAIR

BACKGROUND OF THE INVENTION

1. Field of the Invention

The present invention relates to a wheelchair and more particularly, to a wheel set structure of an electric wheelchair.

2. Description of the Related Art

A conventional electric wheelchair 1a, as shown in FIG. 1, comprises wheelchair frame 10a, a pair of front wheel assemblies 11a, a pair of middle wheel assemblies 12a, and a pair of rear wheel assemblies 13a. The wheelchair frame 10a has two pivot holders 102a bilaterally disposed at the front side, and an upright set stem 104a supporting a chair 14a. The front wheel assemblies 11a each have a front wheel holder 112a respectively pivotally connected to the pivot holders 102a and pivotally holding a respective front wheel 114a. The middle wheel assemblies 12a each have a middle wheel holder 122a respectively pivotally connected to the pivot holders 102a and pivotally holding a respective middle wheel 124a. The rear wheel assemblies 13a each have a rear wheel holder 132a respectively fastened to the rear side of the wheelchair frame 10a and pivotally holding a respective rear wheel 134a.

By means of pivotally connecting the front wheel holders 112a and the middle wheel holders 122a to the pivot holders 102a, the front wheel holders 112a and the middle wheel holders 122a can be biased relative to the wheelchair frame 10a when the electric wheelchair 1a is moving over an uneven road surface.

When a user is going to sit on or to leave from the chair 14a of the electric wheelchair 1a, the user will step on a footplate 15a that is fixedly fastened to the front side of the wheelchair frame 10a. When the user steps on the footplate 15a, the user's whole body weight is allocated on the footplate 15a. If the footplate 15a receives an excessively high pressure, the wheelchair frame 10a will be forced to turn about the axis extending through the pivot holders 102a, lifting the rear side of the wheelchair frame 10a from the ground. At this time, the chair 14a may collapse, causing the user to fall to the ground or to be hurt by the chair 14a. Therefore, this prior art electric wheelchair 1a is still not safe in use, tending to cause accidental injury.

SUMMARY OF THE INVENTION

The present invention has been accomplished under the circumstances in view. It is the main object of the present invention to provide a wheel set structure of an electrical wheelchair, which provides a stable mechanical design for enabling the first wheel assemblies and the driving wheel of each transmission wheel assembly to be moved up and down relatively so that the electrical wheelchair can be moved upwards or downwards over a step.

To achieve this and other objects of the present invention, a wheel set structure of an electric wheelchair in accordance with the present invention comprises a wheelchair frame, which defines a first steering direction and a second steering direction reversed to the first steering direction, at least one swinging mechanism pivotally mounted on the wheelchair frame each having a swinging member and a wheel holder, at least one transmission wheel assembly connected to the swinging member each having a motor and a driving wheel coupled to and rotatable by the motor, and at least one first wheel assembly mounted on the wheel holder each pivotally holding a wheel. When the at least one swinging member is biased relative to the at least one wheelchair frame, the at least one first wheel assembly is biased with the at least one swinging member so that the elevation of the wheel of each first wheel assembly and the elevation of the driving wheel of each transmission wheel assembly are relatively changed at a constant ratio.

Further, the number of at least one of the at least one swinging mechanism, the at least one transmission wheel assembly and the at least one first wheel assembly is 2 and bilaterally arranged on the wheelchair frame.

Further, the at least one first wheel assembly can be set in the first steering direction or second steering direction of the wheelchair frame.

Further, the wheel holder of each swinging mechanism is pivotally mounted on wheelchair frame in such a manner that the axis of the pivot connection between the wheel holder of each swinging mechanism and the wheelchair frame is same as the axis of the pivot connection between the swinging member of each swinging mechanism and the wheelchair frame.

Further, the wheel holder of each swinging mechanism can be formed integral with the swinging member of the respective swinging mechanism or fixedly fastened thereby by welding or by means of a screw joint or rivet joint.

Further, each swinging mechanism further comprises a rigid link, which has two distal ends respectively connected to the at least one first wheel assembly and the swinging member of the respective swinging mechanism.

Further, the two distal ends of the rigid link are respectively pivotally connected to the at least one first wheel assembly and the swinging member of the respective swinging mechanism.

The wheel set structure further comprises at least one second wheel assembly mounted on the wheelchair frame and set in one of the first steering direction and the second steering direction reversed to the at least one first wheel assembly.

Further, the at least one second wheel assembly and the at least one first wheel assembly have a same structure.

DETAILED DESCRIPTION OF THE INVENTION

Figure 1:
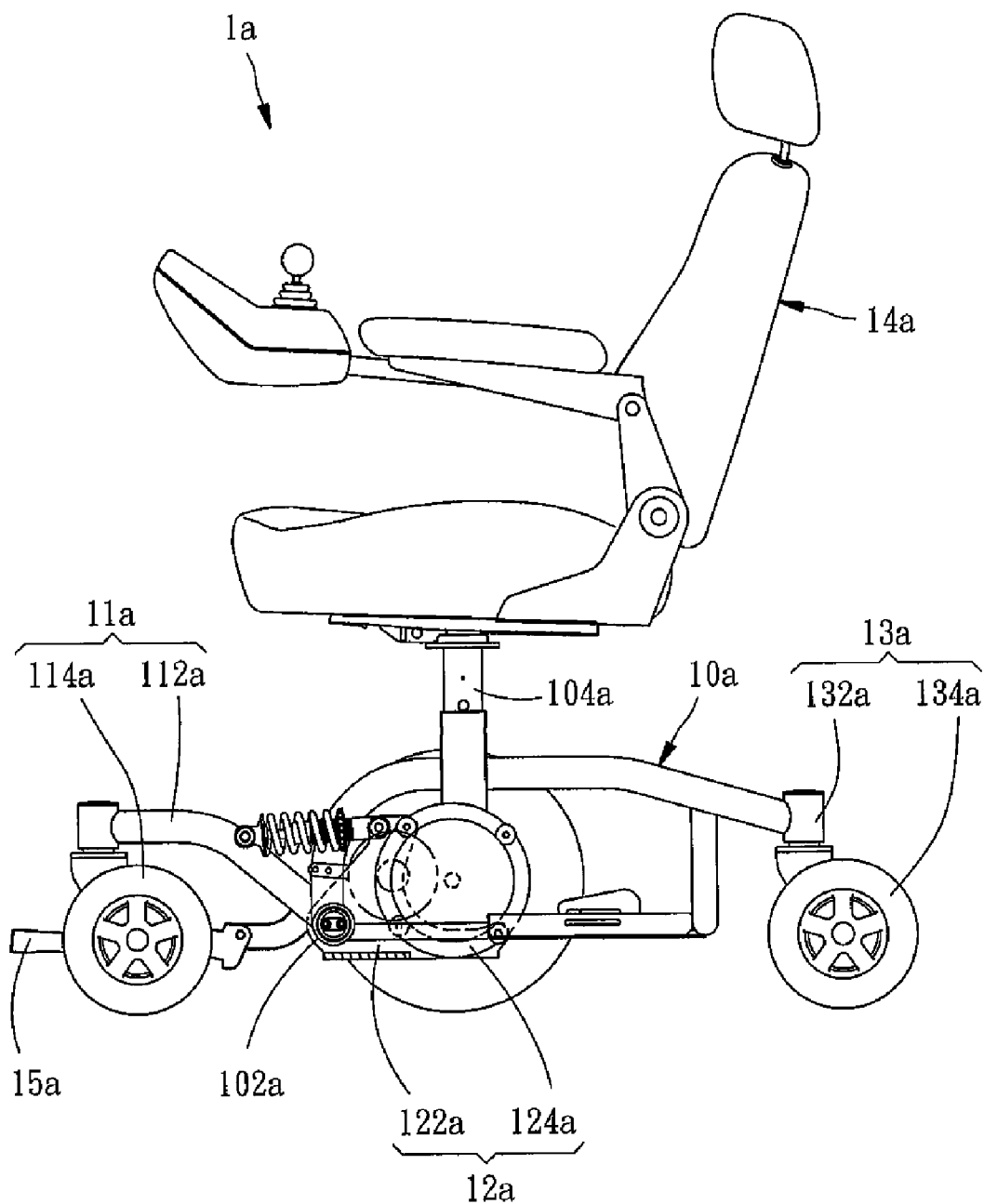
FIG. 1 is a schematic side view of an electric wheelchair according to the prior art.
Figure 2:
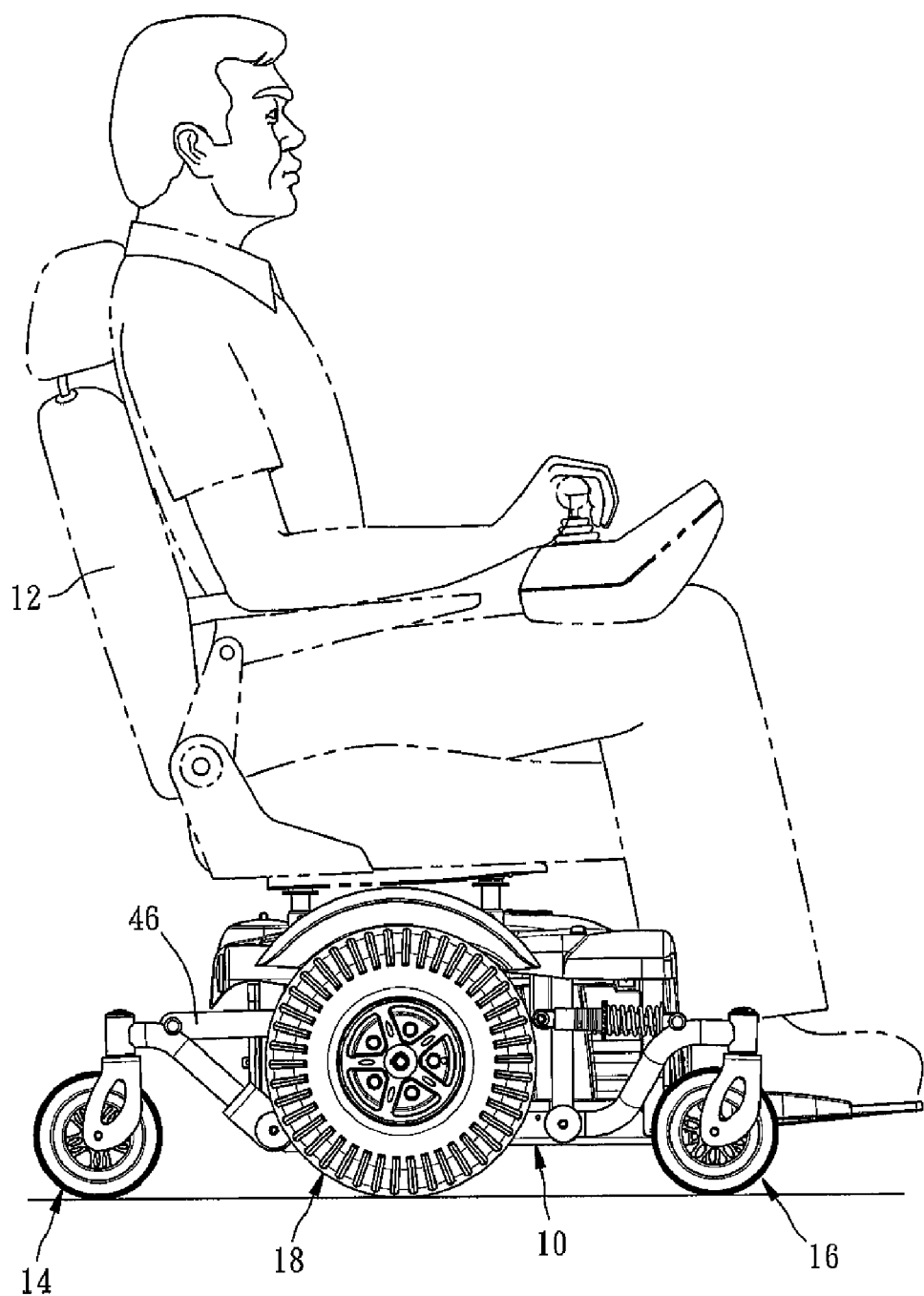
FIG. 2 is an applied view of a wheel set structure of an electric wheelchair in accordance with a first embodiment of the present invention.

Referring to FIG. 2, a wheel set structure of an electric wheelchair in accordance with a first embodiment of the present invention is shown comprising a wheelchair frame 10, a chair 12 supported on the wheelchair frame 10, two first wheel assemblies 14 bilaterally arranged on the front side of the wheelchair frame 10, two second wheel assemblies 16 bilaterally arranged on the rear side of the wheelchair frame 10, and two transmission wheel assemblies 18 bilaterally arranged on the middle of the wheelchair frame 10.

Figure 3:
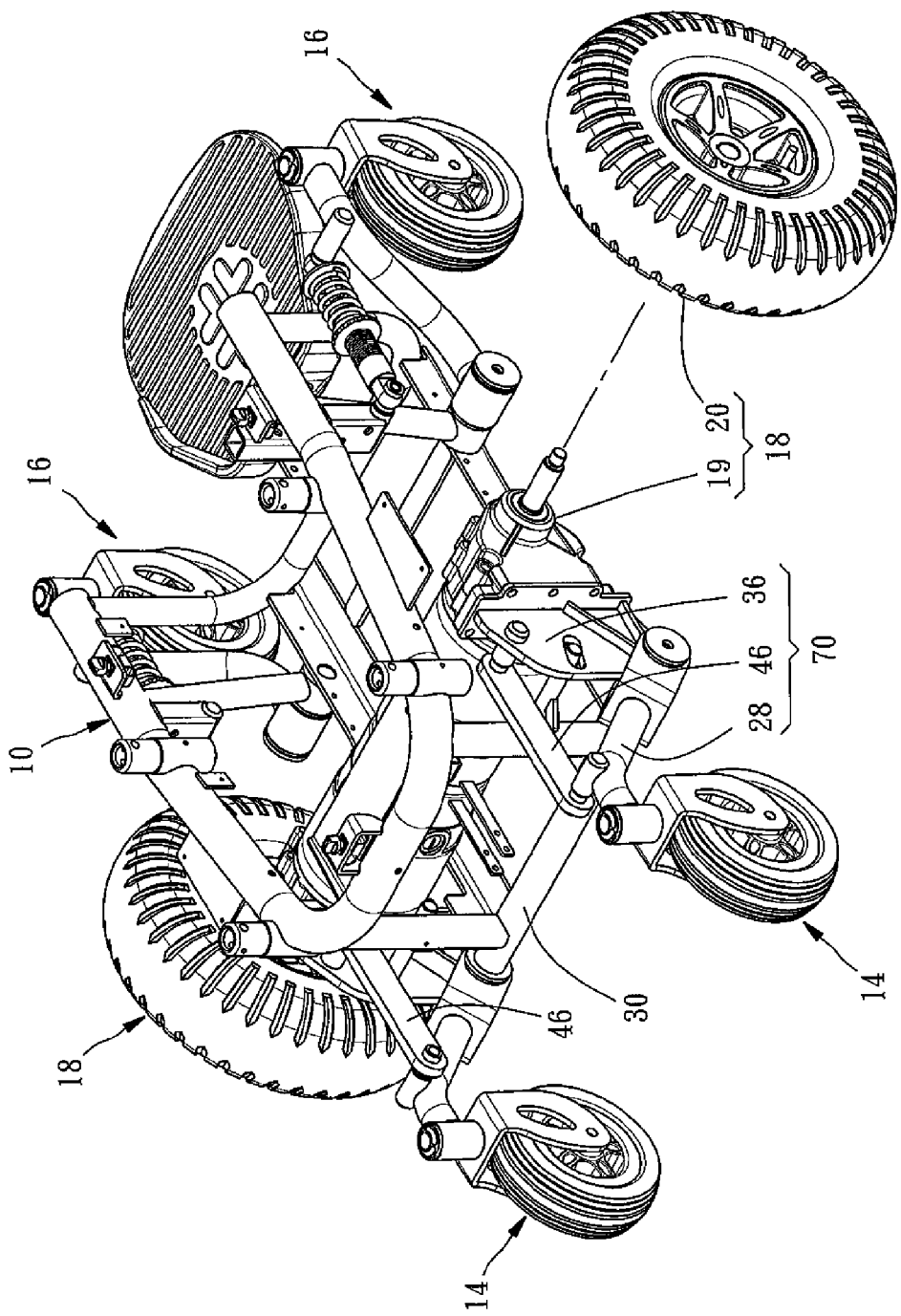
FIG. 3 is an oblique elevation of the wheel set structure in accordance with the first embodiment of the present invention.
Figure 4:
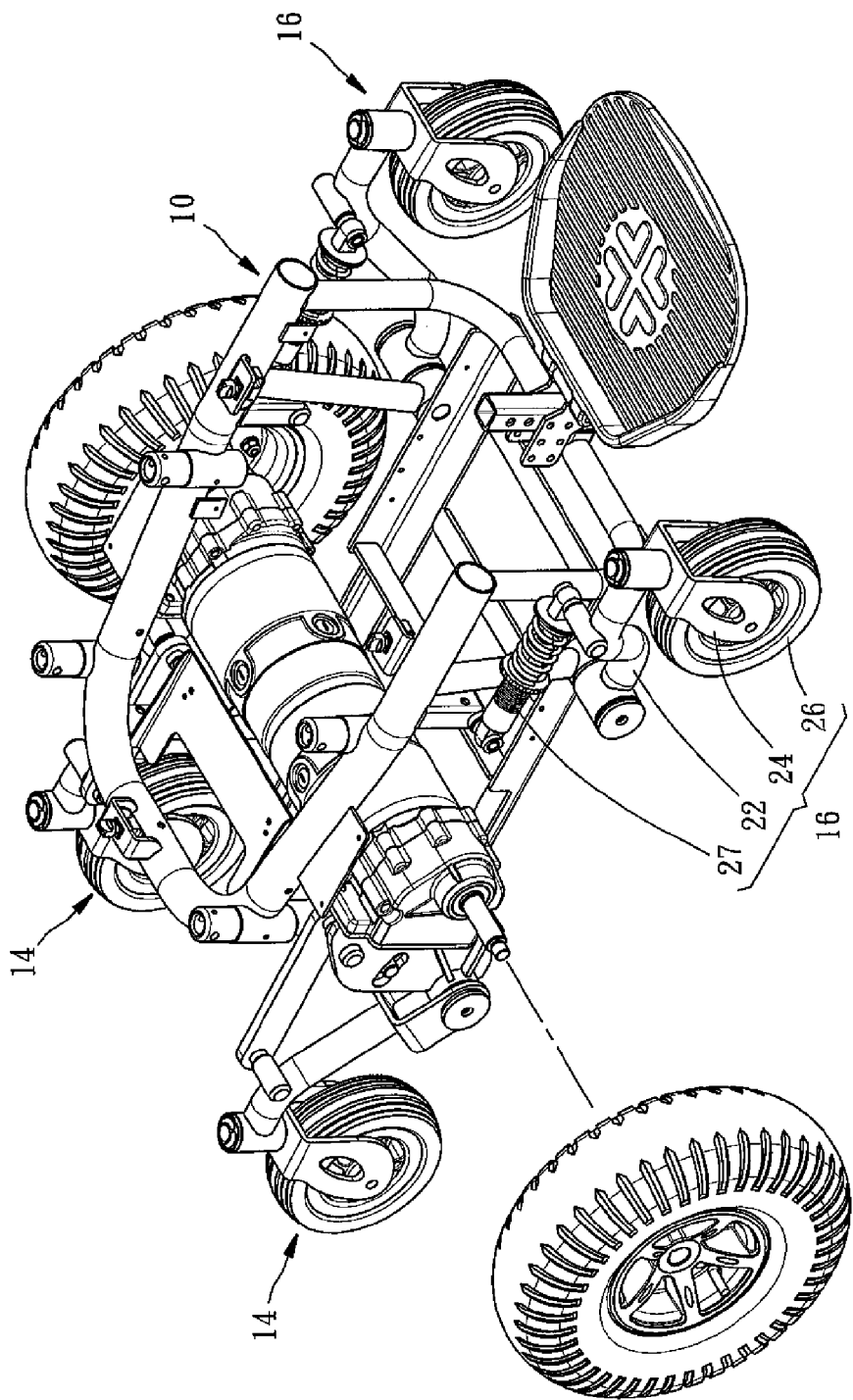
FIG. 4 corresponds to FIG. 3 when viewed from another angle.
Figure 5:
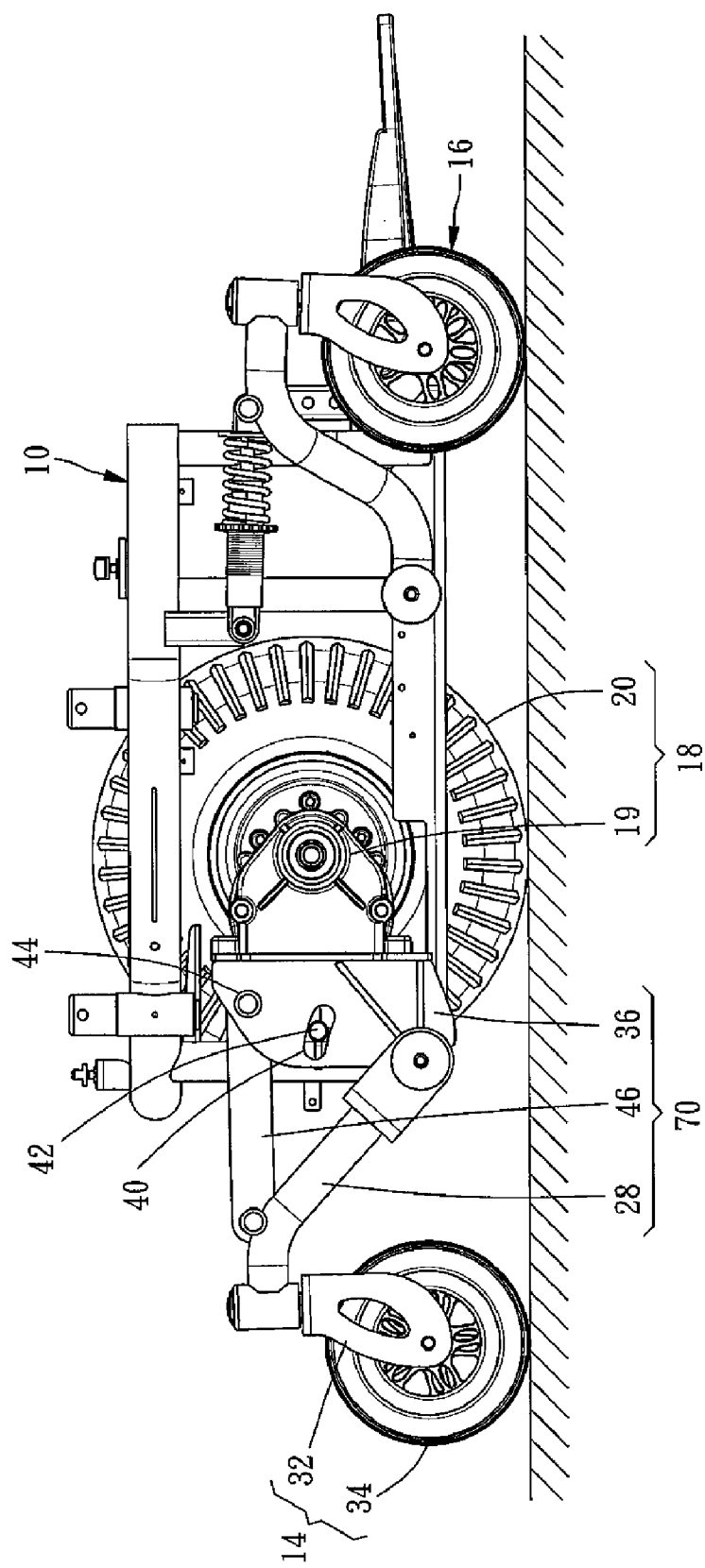
FIG. 5 is a side view of the wheel set structure in accordance with the first embodiment of the present invention.

Referring to FIGS. 3~5, the wheel set structure of the electric wheelchair further comprises a pair of swinging mechanisms 70 bilaterally arranged on the middle of the wheelchair frame 10.

The wheelchair frame 10 is made of a number of metal rod members. Further, the wheelchair frame 10 carries a battery pack and a steering control mechanism. These devices are not shown in the annexed drawings; however, they are requisite components of a regular electric wheelchair obvious to any person skilled in the art. The wheelchair frame 10 defines a first steering direction, and a second steering direction reversed to the first steering direction.

Each swinging mechanism 70 comprises a swinging member 36, a wheel holder 28 and a link 46.

The swinging members 36 of the swinging mechanisms 70 are plate members respectively pivotally connected to the two distal ends of a first transverse rod member 30 of the wheelchair frame 10. Each swinging member 36 has a sliding slot 40 coupled to one respective guide pin 42 of the wheelchair frame 10 that limits the swinging angle of the respective swinging member 36 relative to the wheelchair frame 10, and a link connection portion 44.

The wheel holders 28 of the swinging mechanisms 70 are respectively pivotally connected to the first transverse rod member 30 of the wheelchair frame 10 near the two distal ends of the first transverse rod member 30. The axis of the pivot connection between each of the swinging members 36 and the wheelchair frame 10 is same as the axis of the pivot connection between each of the first wheel assemblies 14 and the wheelchair frame 10.

The links 46 of the swinging mechanism 70 are rigid metal rod members respectively pivotally connected between the wheel holders 28 and the link connection portions 44 of the winging members 36.

The transmission wheel assemblies 18 each comprise a motor 19 (including a speed changer) and a driving wheel 20 mounted on the output shaft of the motor 19.

Each first wheel assembly 14 comprises a wheel fork 32 connected to one of the wheel holders 28 of the swinging mechanisms 70, and a wheel 34 pivotally mounted on the wheel fork 32. The first wheel assemblies 14 are set in the first steering direction of the electric wheelchair.

Each second wheel assembly 16 comprises a wheel bracket 22 pivotally mounted on the wheelchair frame 10, a wheel fork 24 connected to the wheel bracket 22, a wheel 26 pivotally mounted on the wheel fork 24, and a shock-absorber 27 horizontally connected between the wheel bracket 22 and the wheelchair frame 10. The second wheel assemblies 16 are set in the second steering direction reversed to the first steering direction of the first wheel assemblies 14.

It is to be understood that the wheelchair 10, the wheel holders 28, the winging members 36 and the links 46 constitute a seesaw, stabilizing movement of the first wheel assemblies 14.

When the at least one swinging member 36 is biased relative to the at least one wheelchair frame 10, the at least one first wheel assembly 14 is biased with the at least one swinging member 36 so that the elevation of the wheel 34 of each first wheel assembly 14 and the elevation of the driving wheel 20 of each transmission wheel assembly 18 are relatively changed at a constant ratio.

The operation of the present invention is outlined hereinafter.

Figure 6:
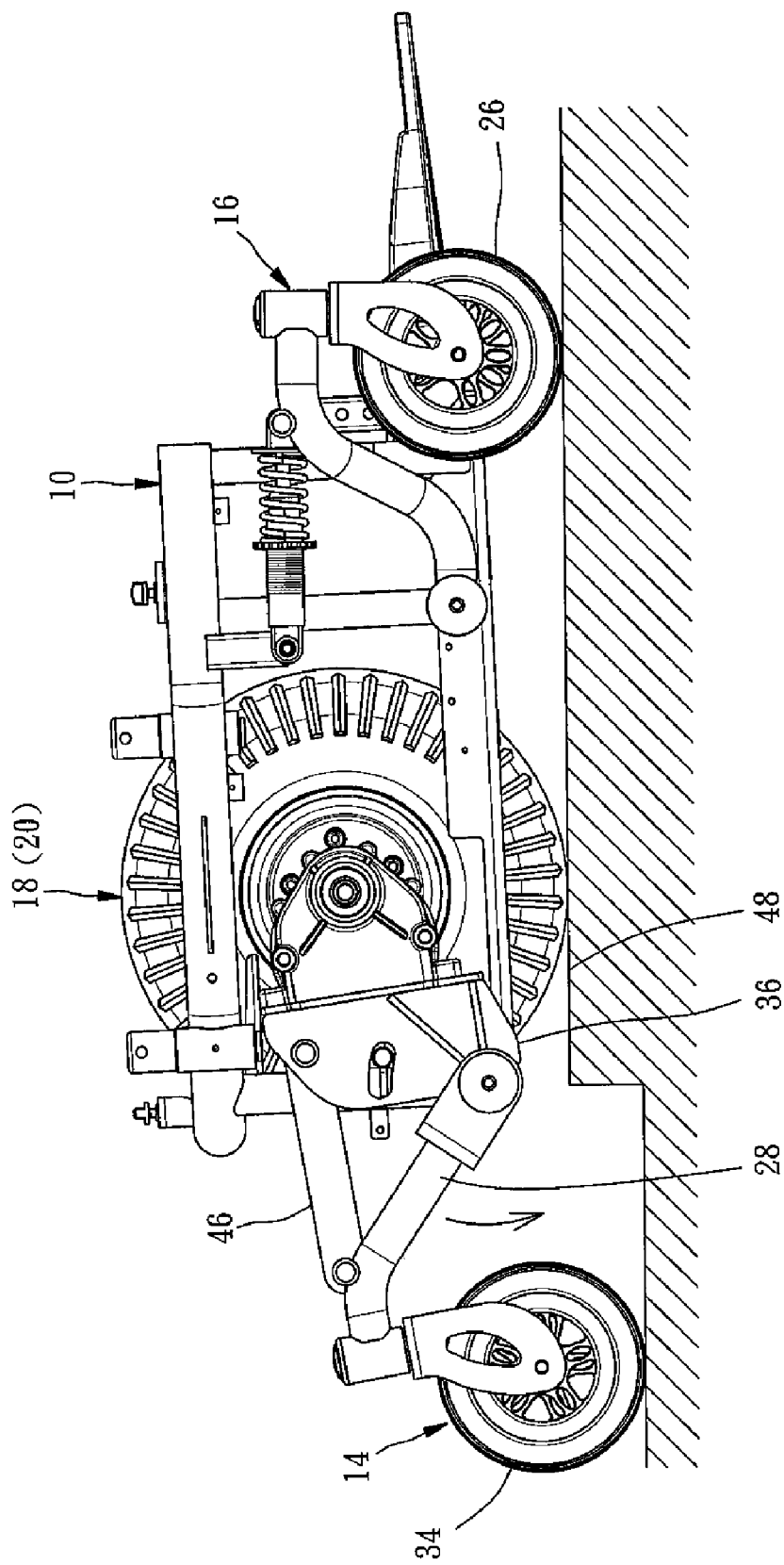
FIG. 6 corresponds to FIG. 5, showing an upward movement of the electric wheelchair over a step.

Referring to FIG. 6, when the electric wheelchair is moving forwardly upwards or backwardly downwards over a step 48 and the wheels 34 of the first wheel assemblies 14 are kept in contact with the tread of the adjacent lower step, the seesaw which is formed of the wheelchair 10, the wheel holders 28, the winging members 36 and the links 46 tilts in one direction. At this time, the guide pins 42 of the wheelchair frame 10 are respectively moved to one ends of the sliding slots 40 of the associating swinging members 36, keeping the driving wheels 20 of the transmission wheel assemblies 18 in positive contact with the tread of the step 48 so that the electric wheelchair can move over the step 48 smoothly.

Figure 7:
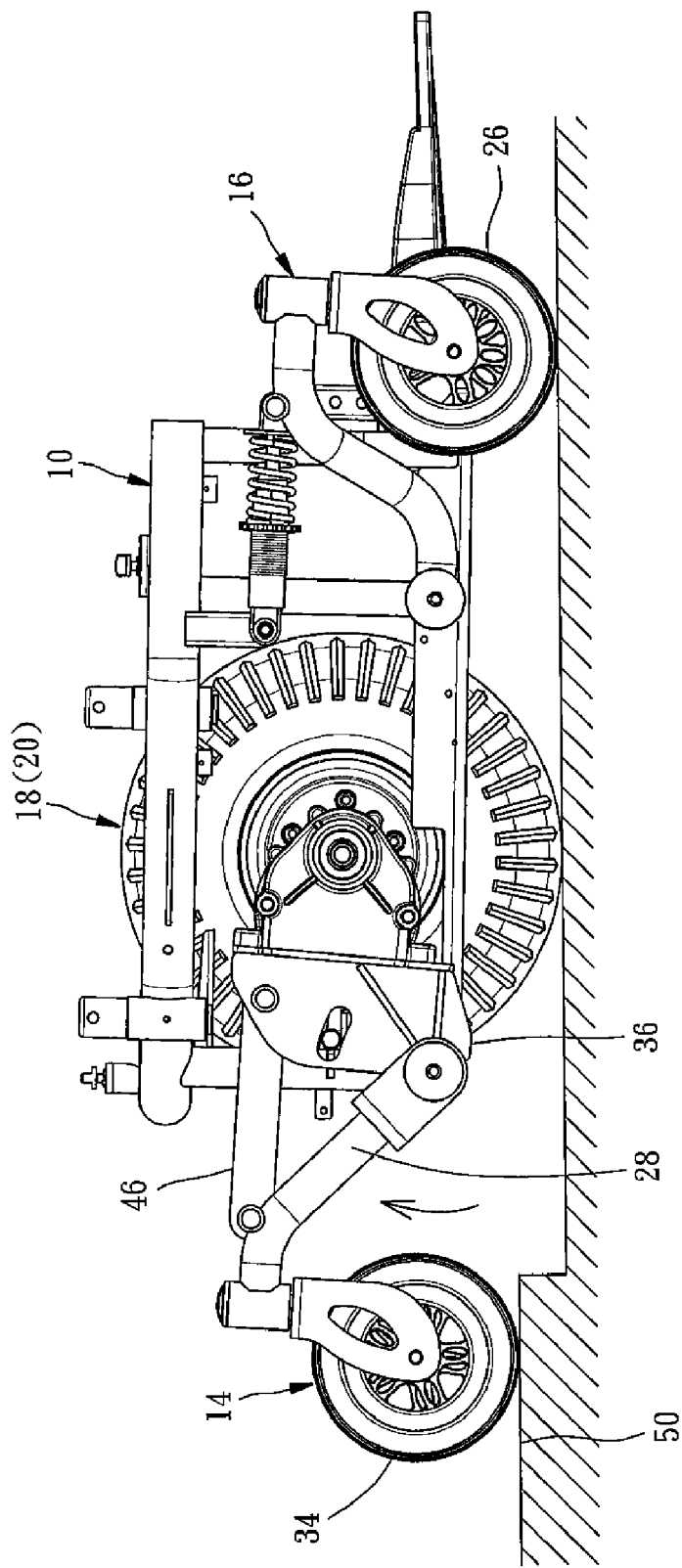
FIG. 7 corresponds to FIG. 5, showing a downward movement of the electric wheelchair over a step.

Referring to FIG. 7, when the electric wheelchair is moving forwardly downwards or backwardly upwards over a step 50, the seesaw which is formed of the wheelchair 10, the wheel holders 28, the winging members 36 and the links 46 tilts in the other direction to keep the wheels 34 of the first wheel assemblies 14 in positive contact with the tread of the step 50. At this time, the guide pins 42 of the wheelchair frame 10 are respectively moved to the other ends of the sliding slots 40 of the associating swinging members 36, keeping the driving wheels 20 of the transmission wheel assemblies 18 in positive contact with the tread of the subsequent lower step so that the electric wheelchair can move over the step 48 smoothly.

Figure 8:
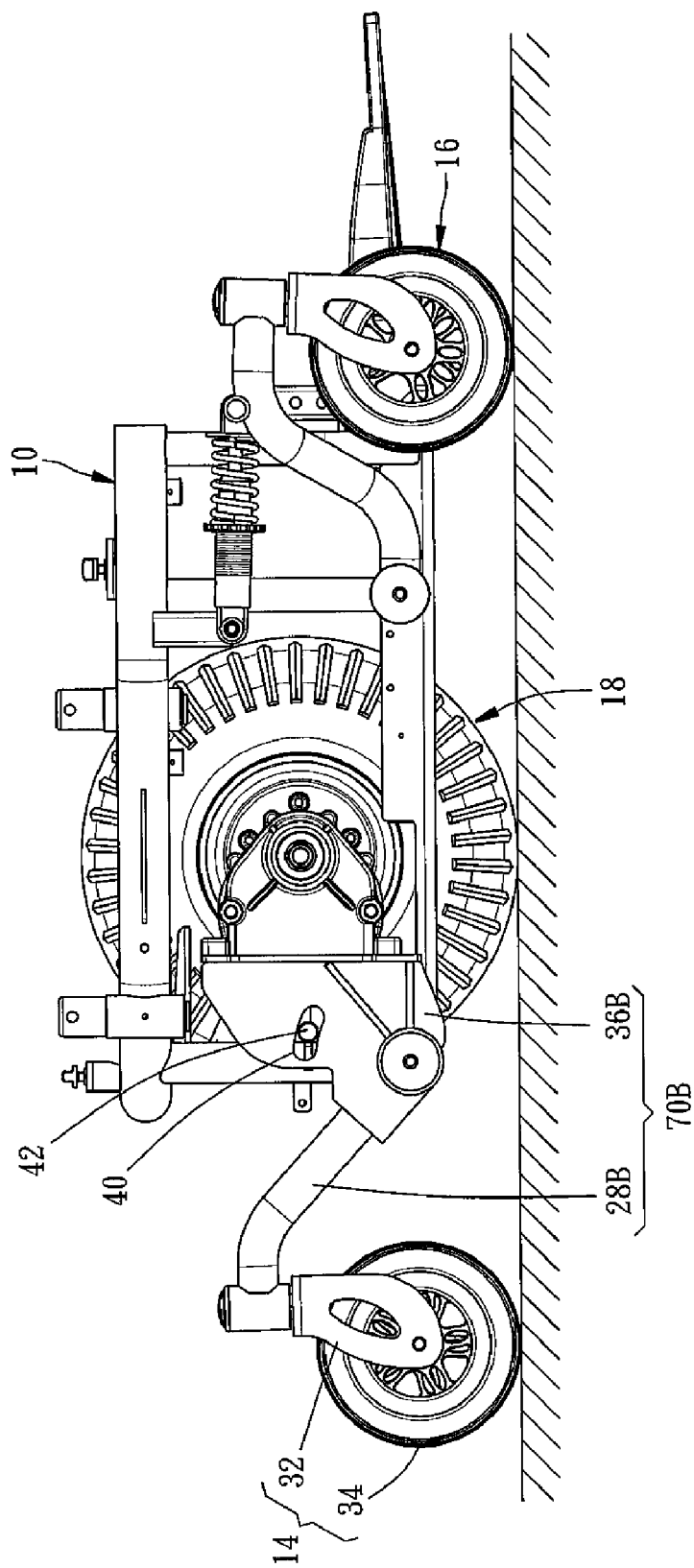
FIG. 8 is a side view of the wheel set structure in accordance with a second embodiment of the present invention.

FIG. 8 shows a wheel set structure of an electric wheelchair in accordance with a second embodiment of the present invention. According to this second embodiment, the swinging mechanisms 70B eliminate the aforesaid links 46, and have the respective wheel holders 28B be respectively fixedly connected to the respective swinging members 36B by welding or by means of a screw joint or rivet joint. This second embodiment achieves the same effects as the aforesaid first embodiment.

Although particular embodiments of the invention have been described in detail for purposes of illustration, various modifications and enhancements may be made without departing from the spirit and scope of the invention. For example, the invention can have the following modifications:

The first wheel assemblies can be set in the second steering direction of the electric wheelchair.

The wheel holders of the swinging mechanisms can be formed integral with the respective swinging members, or fixedly fastened to the respective swinging members by welding or by means of a screw joint of rivet joint.

The links are respectively pivotally connected to the respective wheel holders and the respective swinging members.

The second wheel assemblies and the first wheel assemblies are identical in structure.

Further, it is to be understood that the seesaw can be provided at the second wheel assemblies for enabling the electric wheelchair to move over a step smoothly during a forward or backward movement.

By means of the use of links with existing component parts, the second wheel assemblies are not to be affixed to the swinging members. Further, the links can be configured to match with different sizes and specifications of first wheel assemblies and swinging members, thereby fitting different designs.

In conclusion, the use of a seesaw in an electric wheelchair in accordance with the present invention enables the first wheel assemblies and the driving wheels of the transmission wheel assemblies to be biased upwards or downwards, facilitating movement of the electric wheelchair over a step.

What is claimed is:

1. A wheel set structure of an electric wheelchair, comprising:
- a wheelchair frame, said wheelchair frame defining a first direction of movement and a second direction of movement reversed from said first direction;
- at least one swinging mechanism pivotally mounted on said wheelchair frame, each said swinging mechanism comprising a swinging member and a wheel holder;
- at least one transmission wheel assembly connected to said swinging member, each said transmission wheel assembly comprising a motor and a driving wheel coupled to and rotatable by said motor;
- at least one first wheel assembly mounted on said wheel holder, each said first wheel assembly pivotally holding a wheel and being pivotable relative to the height of the transmission wheel assembly;
- wherein when said at least one swinging member is biased relative to said wheelchair frame, said at least one first wheel assembly is biased with said at least one swinging member so that the elevation of the wheel of each said first wheel assembly and the elevation of the driving wheel of each said transmission wheel assembly are relatively changed at a constant ratio; and
- wherein each said swinging mechanism further comprises a rigid link, said rigid link having two distal ends respectively connected to said at least one first wheel assembly and the swinging member of the respective swinging mechanism.

2. The wheel set structure as claimed in claim 1, wherein there are at least two of said at least one swinging mechanism, said at least one transmission wheel assembly and said at least one first wheel assembly bilaterally arranged on the wheelchair frame.

3. The wheel set structure as claimed in claim 1, wherein said at least one first wheel assembly is set in the first direction of said wheelchair frame.

4. The wheel set structure as claimed in claim 3, further comprising at least one second wheel assembly mounted on said wheelchair frame and set in one of said first direction and said second direction reversed from said at least one first wheel assembly.

5. The wheel set structure as claimed in claim 1, wherein said at least one first wheel assembly is set in the second direction of said wheelchair frame.

6. The wheel set structure as claimed in claim 5, further comprising at least one second wheel assembly mounted on said wheelchair frame and set in one of said first direction and said second direction reversed from said at least one first wheel assembly.

7. The wheel set structure as claimed in claim 1, wherein the wheel holder of each said swinging mechanism is pivotally mounted on said wheelchair frame in such a manner that the axis of the pivot connection between the wheel holder of each said swinging mechanism and said wheelchair frame is same as the axis of the pivot connection between the swinging member of each said swinging mechanism and said wheelchair frame.

8. The wheel set structure as claimed in claim 1, further comprising at least one second wheel assembly mounted on said wheelchair frame and set in one of said first direction and said second direction reversed to said at least one first wheel assembly.

9. A wheel set structure of an electric wheelchair, comprising:
- a wheelchair frame, said wheelchair frame defining a first direction of movement and a second direction of movement reversed from said first direction;
- at least one swinging mechanism pivotally mounted on said wheelchair frame, each said swinging mechanism comprising a swinging member and a wheel holder;
- at least one transmission wheel assembly connected to said swinging member, each said transmission wheel assembly comprising a motor and a driving wheel coupled to and rotatable by said motor; and
- at least one first wheel assembly mounted on said wheel holder, each said first wheel assembly pivotally holding a wheel;
- wherein when said at least one swinging member is biased relative to said at least one wheelchair frame, said at least one first wheel assembly is biased with said at least one swinging member so that the elevation of the wheel of each said first wheel assembly and the elevation of the driving wheel of each said transmission wheel assembly are relatively changed at a constant ratio;
- wherein the wheel holder of each said swinging mechanism is pivotally mounted on said wheelchair frame in such a manner that the axis of the pivot connection between the wheel holder of each said swinging mechanism and said wheelchair frame is same as the axis of the pivot connection between the swinging member of each said swinging mechanism and said wheelchair frame;
- wherein each said swinging mechanism further comprises a rigid link, said rigid link having two distal ends respectively connected to said at least one first wheel assembly and the swinging member of the respective swinging mechanism.

10. The wheel set structure as claimed in claim 9, wherein the two distal ends of said rigid link are respectively pivotally connected to said at least one first wheel assembly and the swinging member of the respective swinging mechanism.

* * * * *